(12) United States Patent
Freeman et al.

(10) Patent No.: US 11,255,210 B1
(45) Date of Patent: Feb. 22, 2022

(54) CERAMIC MATRIX COMPOSITE TURBINE SHROUD ASSEMBLY WITH JOINED COVER PLATE

(71) Applicants: Rolls-Royce Corporation, Indianapolis, IN (US); Rolls-Royce High Temperature Composites Inc., Cypress, CA (US)

(72) Inventors: Ted J. Freeman, Danville, IN (US); Jeremy Roehm, Plainfield, IN (US)

(73) Assignees: Rolls-Royce Corporation, Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 0 days.

(21) Appl. No.: 17/082,740

(22) Filed: Oct. 28, 2020

(51) Int. Cl.
*F01D 11/08* (2006.01)
*F01D 25/00* (2006.01)
*F01D 25/24* (2006.01)

(52) U.S. Cl.
CPC ............ *F01D 11/08* (2013.01); *F01D 25/005* (2013.01); *F01D 25/246* (2013.01); *F05D 2220/32* (2013.01); *F05D 2240/11* (2013.01)

(58) Field of Classification Search
CPC ...... F01D 11/08; F01D 25/005; F01D 25/246; F01D 9/04; F05D 2240/11
See application file for complete search history.

(56) References Cited

U.S. PATENT DOCUMENTS

| | | | |
|---|---|---|---|
| 3,066,911 A | 12/1962 | Anderson et al. | |
| 4,676,715 A | 6/1987 | Imbault et al. | |
| 5,203,673 A | 4/1993 | Evans | |
| 5,295,787 A | 3/1994 | Leonard et al. | |
| 5,330,321 A * | 7/1994 | Roberts | F01D 11/18 415/136 |
| 5,368,444 A | 11/1994 | Anderson | |
| 5,405,245 A | 4/1995 | Cornelius | |
| 5,441,385 A | 8/1995 | Boyd et al. | |
| 5,459,995 A | 10/1995 | Norton et al. | |
| 5,584,651 A | 12/1996 | Pietraszkiewicz et al. | |
| 5,593,276 A | 1/1997 | Proctor et al. | |
| 5,593,277 A * | 1/1997 | Proctor | F01D 11/18 415/115 |
| 6,821,085 B2 | 11/2004 | Darkins, Jr. et al. | |
| 6,877,952 B2 * | 4/2005 | Wilson | F01D 11/18 415/136 |
| 6,884,026 B2 * | 4/2005 | Glynn | F01D 11/08 415/113 |
| 7,210,899 B2 * | 5/2007 | Wilson, Jr. | F01D 11/18 415/173.1 |
| 7,416,362 B2 * | 8/2008 | North | F16B 5/0241 267/150 |
| 7,494,317 B2 * | 2/2009 | Keller | F01D 11/025 415/136 |
| 7,534,086 B2 | 5/2009 | Mazzola et al. | |
| 7,563,071 B2 | 7/2009 | Campbell et al. | |

(Continued)

*Primary Examiner* — Woody A Lee, Jr.
*Assistant Examiner* — Behnoush Haghighian
(74) *Attorney, Agent, or Firm* — Barnes & Thornburg LLP (57) ABSTRACT

An assembly adapted for use in a gas turbine engine includes a carrier and a blade track segment that is supported by the carrier relative to a high temperature zone. The blade track segment provides a heat shield for use in high temperature applications protecting the carrier and other components.

20 Claims, 4 Drawing Sheets

(56) References Cited

U.S. PATENT DOCUMENTS

| | | | |
|---|---|---|---|
| 7,874,059 B2 | 1/2011 | Morrison et al. | |
| 8,388,309 B2 | 3/2013 | Marra et al. | |
| 8,790,067 B2 | 7/2014 | McCaffrey et al. | |
| 8,905,709 B2 | 12/2014 | Dziech et al. | |
| 8,944,756 B2 | 2/2015 | Lagueux | |
| 8,979,489 B2 | 3/2015 | Taillant et al. | |
| 9,587,504 B2 | 3/2017 | McCaffrey et al. | |
| 9,587,517 B2 | 3/2017 | Vetters et al. | |
| 9,752,592 B2 * | 9/2017 | Sippel | F04D 29/522 |
| 9,863,265 B2 * | 1/2018 | Stapleton | F01D 11/08 |
| 9,874,104 B2 | 1/2018 | Shapiro | |
| 10,012,100 B2 * | 7/2018 | Vetters | F01D 21/003 |
| 10,030,541 B2 | 7/2018 | Vetters et al. | |
| 10,082,039 B2 | 9/2018 | Hanson | |
| 10,094,233 B2 * | 10/2018 | Landwehr | F01D 9/04 |
| 10,145,252 B2 * | 12/2018 | Kirby | C04B 35/565 |
| 10,174,628 B2 | 1/2019 | Humhauser et al. | |
| 10,190,434 B2 * | 1/2019 | Westphal | F01D 5/02 |
| 10,301,960 B2 * | 5/2019 | Stapleton | F01D 9/042 |
| 10,370,991 B2 | 8/2019 | Wilson et al. | |
| 10,371,008 B2 * | 8/2019 | Sippel | F01D 25/005 |
| 10,378,385 B2 | 8/2019 | Tesson et al. | |
| 10,378,386 B2 | 8/2019 | Roussille et al. | |
| 10,422,241 B2 | 9/2019 | McCaffrey et al. | |
| 10,683,770 B2 * | 6/2020 | Freeman | F01D 5/284 |
| 10,689,998 B2 * | 6/2020 | Stapleton | F01D 11/24 |
| 10,690,007 B2 * | 6/2020 | Quennehen | F01D 11/08 |
| 10,711,630 B2 * | 7/2020 | Waldman | F01D 11/003 |
| 10,787,924 B2 * | 9/2020 | Quennehen | F01D 11/005 |
| 10,858,958 B2 * | 12/2020 | Quennehen | F01D 25/246 |
| 10,934,873 B2 * | 3/2021 | Sarawate | F01D 11/005 |
| 11,015,613 B2 * | 5/2021 | Kerns | F01D 11/08 |
| 2004/0071548 A1 * | 4/2004 | Wilson, Jr. | F01D 11/18 415/173.1 |
| 2005/0265827 A1 * | 12/2005 | Wilson, Jr. | F01D 11/18 415/173.3 |
| 2006/0292001 A1 * | 12/2006 | Keller | F01D 11/025 415/170.1 |
| 2013/0004306 A1 | 1/2013 | Albers et al. | |
| 2015/0044044 A1 * | 2/2015 | Sippel | F04D 29/522 415/220 |
| 2016/0177786 A1 * | 6/2016 | Sippel | F01D 11/08 416/189 |
| 2016/0305265 A1 * | 10/2016 | Stapleton | F01D 11/08 |
| 2017/0016341 A1 * | 1/2017 | Stapleton | F01D 9/042 |
| 2017/0167279 A1 * | 6/2017 | Kirby | C04B 35/495 |
| 2018/0051581 A1 | 2/2018 | Quenehen et al. | |
| 2018/0051591 A1 | 2/2018 | Quennehen et al. | |
| 2018/0073398 A1 | 3/2018 | Quennehen et al. | |
| 2018/0080343 A1 | 3/2018 | Groleau et al. | |
| 2018/0156069 A1 * | 6/2018 | Quennehen | F01D 11/08 |
| 2018/0195403 A1 * | 7/2018 | Kerns | F01D 11/08 |
| 2018/0340440 A1 * | 11/2018 | Freeman | F01D 9/042 |
| 2018/0355761 A1 | 12/2018 | Maar | |
| 2019/0040758 A1 * | 2/2019 | Quennehen | F01D 11/08 |
| 2019/0040761 A1 | 2/2019 | Carlin et al. | |
| 2019/0084892 A1 | 3/2019 | Subramanian et al. | |
| 2019/0101027 A1 | 4/2019 | Lepretre et al. | |
| 2019/0128132 A1 | 5/2019 | Tableau et al. | |
| 2019/0292929 A1 * | 9/2019 | Waldman | F01D 11/16 |
| 2020/0131938 A1 * | 4/2020 | Tableau | F01D 11/005 |
| 2021/0025284 A1 | 1/2021 | Sippel | |
| 2021/0131300 A1 * | 5/2021 | Arbona | F01D 11/005 |

\* cited by examiner

CERAMIC MATRIX COMPOSITE TURBINE SHROUD ASSEMBLY WITH JOINED COVER PLATE

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, manufacture and assembly of ceramic matrix composite components with traditional arrangements may present challenges due to material properties of the ceramic matrix composite components.

SUMMARY

The present disclosure may comprise one or more of the following features and combinations thereof.

A turbine shroud assembly adapted for use in a gas turbine engine may comprise a carrier, a blade track segment, a first pin, and a cover plate. The carrier may comprise metallic materials and may be arranged to extend circumferentially at least partway about an axis. The blade track segment may comprise ceramic matrix composite materials.

In some embodiments, the blade track segment may be formed to include a runner, a forward mount post, and a second mount post. The runner may be shaped to extend circumferentially partway around the axis. The forward mount post may extend radially outward from the runner. The aft mount post may extend radially outward from the runner. The aft mount post may be spaced apart axially from the forward mount post to define a channel therebetween.

In some embodiments, the first pin may extend into a first pin hole formed through the forward mount post and a first pin hole formed through the second mount post to couple the blade track segment to the carrier. The cover plate may be joined to the blade track segment and arranged over at least a portion of the first pin hole formed through the aft mount post.

In some embodiments, the cover plate may provide a seal surface. The seal surface may be engaged as part of a seal that is radially aligned with the first pin hole of the aft mount post so as to allow for a low profile aft mount post while also resisting the movement of gases across the seal.

In some embodiments, the seal may be a chordal seal. The chordal seal may be formed between the carrier and the cover plate to resist the movement of gases radially into or out of the turbine shroud assembly along the aft mount post of the blade track segment.

In some embodiments, the chordal seal may be provided by a protrusion from the carrier. The protrusion may engage an aft-facing land surface of the cover plate.

In some embodiments, the chordal seal may be provided by a protrusion from the cover plate. The protrusion may engage a forward-facing land surface of the carrier.

In some embodiments, the cover plate may comprise ceramic-containing materials. The cover plate may have a coefficient of thermal expansion similar to that of the blade track segment.

In some embodiments, the cover plate may be joined to the blade track segment via a braze layer. The braze layer may fix the cover plate in place relative to the blade track segment.

In some embodiments, the cover plate may comprise ceramic matrix composite materials and may be joined to the blade track segment via a ceramic-containing matrix material. The ceramic-containing matrix material may co-infiltrate both the cover plate and the blade track segment to fix the cover plate in place relative to the blade track segment.

In some embodiments, the cover plate may comprise metallic materials so as to conduct heat from the blade track segment. In some embodiments, the cover plate may be joined to the blade track segment via a braze layer to fix the cover plate in place relative to the blade track segment.

In some embodiments, the cover plate may include a seal panel and a pin plug. The pin plug may extend into a the first pin hole of the aft mount post to provide additional contact surface for joining the cover plate to the blade track segment.

According to another aspect of the present disclosure, an assembly adapted for use in high temperature applications may comprise a carrier, a heat shield, a first pin, and a cover plate. The carrier may comprise metallic materials. The heat shield may comprise ceramic matrix composite materials adapted to protect the carrier from high temperatures in a high temperature zone.

In some embodiments, the heat shield may be formed to include a runner, a forward mount post, and an aft mount post. The runner may be arranged to face the high temperature zone. The forward mount post may extend outward from the runner away from the high temperature zone. The aft mount post may extend outward from the runner away from the high temperature zone. The aft mount post may be spaced apart from the forward mount post to define a channel therebetween.

In some embodiments, the first pin may extend into a first pin hole formed through the forward mount post and a first pin hole formed through the second mount post to couple the heat shield to the carrier. The cover plate may be joined to the heat shield and may be arranged to close off at least a portion of the first pin hole formed through the aft mount post so as to block movement of the first pin through the aft mount post.

In some embodiments, a seal may be formed between the carrier and the cover plate to resist the movement of gases.

In some embodiments, the seal may be provided by a protrusion from the carrier that engages a land surface of the cover plate.

In some embodiments, the seal may be provided by a protrusion from the cover plate. The protrusion may engage a land surface of the carrier.

In some embodiments, the cover plate may include a seal panel and a pin plug. The pin plug may extend from the seal panel into a the first pin hole of the aft mount post to provide additional contact surface for joining the cover plate to the blade track segment.

In some embodiments, the cover plate may comprise ceramic-containing materials so as to have a coefficient of thermal expansion similar to that of the heat shield. In some embodiments, the cover plate may comprise metallic materials so as to conduct heat from the heat shield.

According to another aspect of the present disclosure, an assembly adapted for use in high temperature applications may comprise a carrier, a heat shield, a first pin, and a cover plate. The carrier may comprise metallic materials. The heat shield may comprise ceramic matrix composite materials adapted to protect the carrier from high temperatures in a high temperature zone.

In some embodiments, the heat shield may be formed to include a runner, a forward mount post, and an aft mount post. The runner may be arranged to face the high temperature zone. The forward mount post may extend outward from the runner away from the high temperature zone. The aft mount post may extend outward from the runner away from the high temperature zone. The aft mount post may be spaced apart from the forward mount post to define a channel therebetween.

In some embodiments, the first pin may extend into a first pin hole formed through the forward mount post and a first pin hole formed through the second mount post to couple the heat shield to the carrier. The cover plate may be joined to the heat shield and arranged over at least a portion of the first pin hole formed through the aft mount post.

In some embodiments, the cover plate may provide a seal surface. The seal surface may engage the carrier to form a seal that is aligned with the first pin hole of the aft mount post so as to allow for a low profile aft mount post while also resisting the movement of gases across the seal.

In some embodiments, the seal may be provided by a protrusion from the carrier. The protrusion may engage a land surface of the cover plate.

In some embodiments, the seal may be provided by a protrusion from the cover plate. The protrusion may engage a land surface of the carrier.

In some embodiments, the cover plate may include a seal panel and a pin plug. The pin plug may extend from the seal panel into the first pin hole of the aft mount post to provide additional contact surface for joining the cover plate to the blade track segment.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 2:
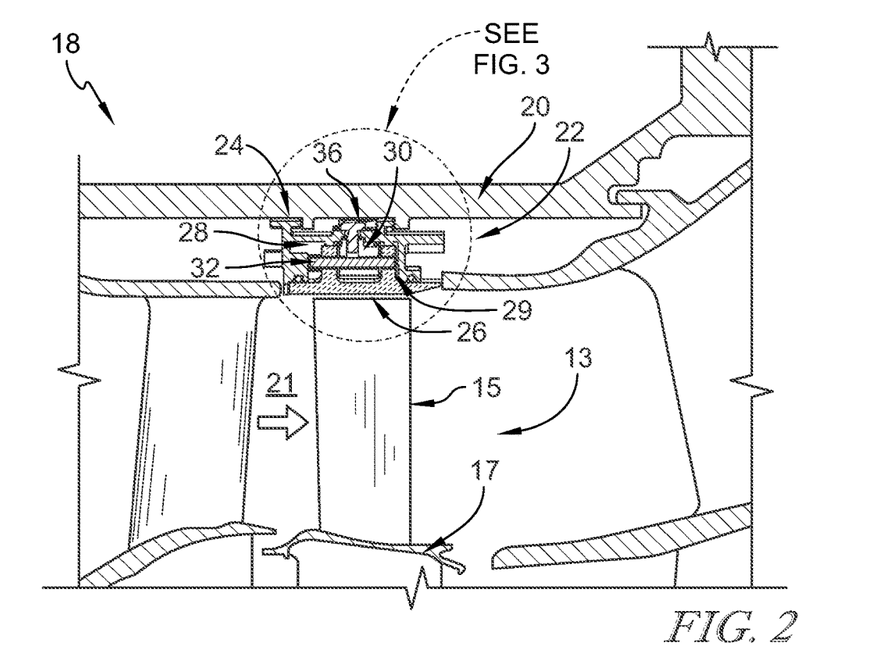
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades.
Figure 3:
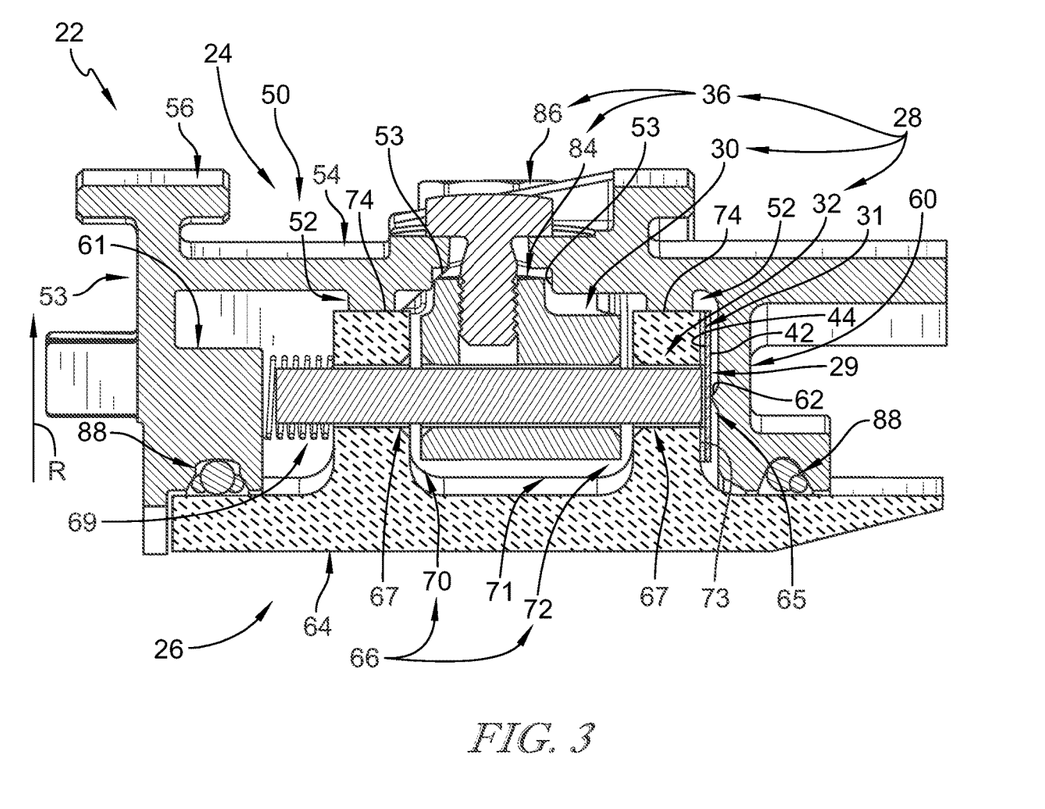
FIG. 3 is a detail cross-sectional view of the turbine shroud assembly showing that the turbine shroud assembly includes a carrier, a blade track segment made from ceramic matrix composite materials, and an intermediate carrier for coupling the blade track segment to the carrier via a pin, and further showing that a cover plate is joined to the blade track segment so as to retain the pin for coupling to the intermediate carrier and to provide a land for a chordal seal blocking gasses from moving into the turbine shroud assembly.
Figure 4:
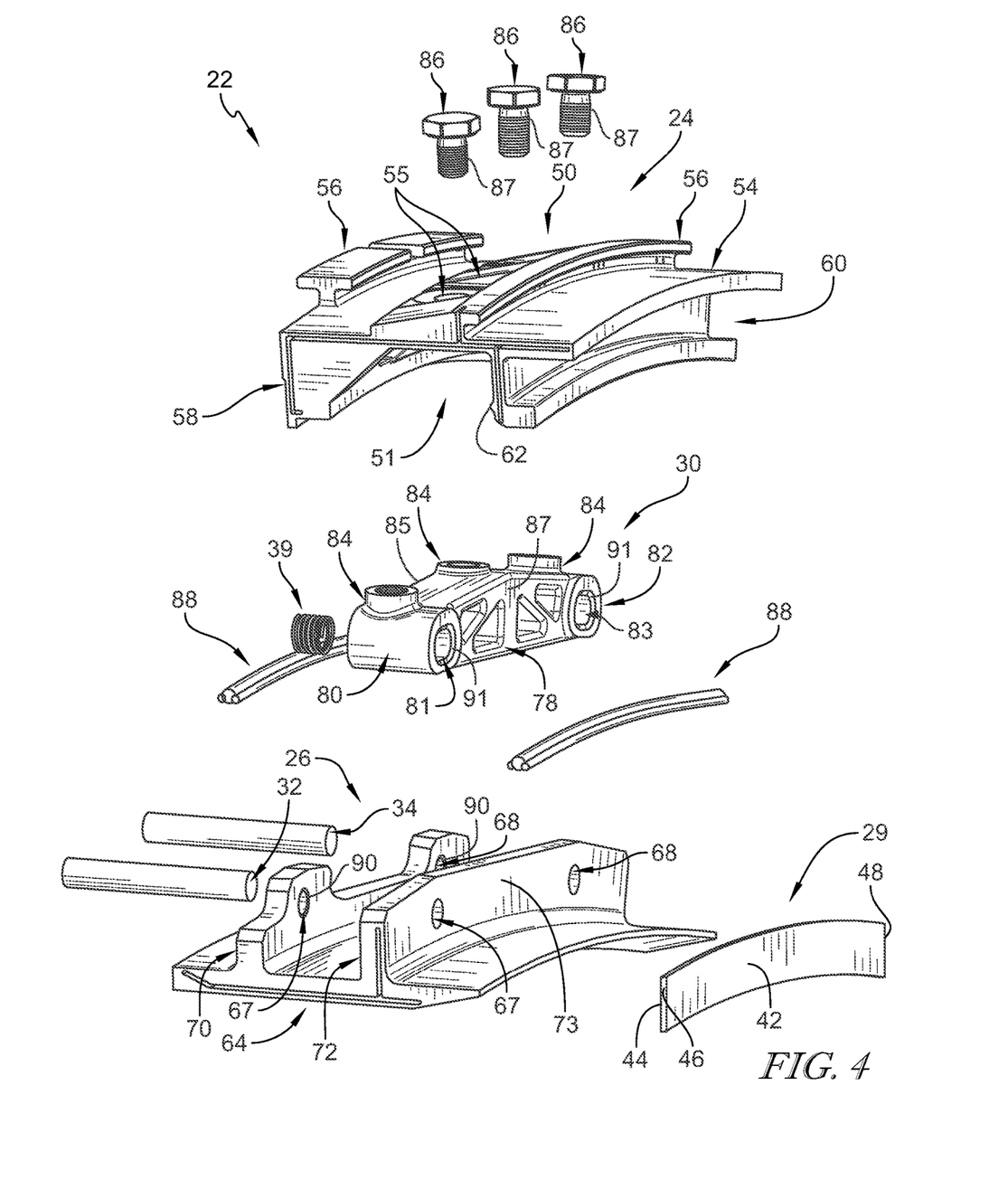
FIG. 4 is an exploded view of the turbine shroud assembly of FIG. 3 showing, from top to bottom, the carrier, the intermediate carrier, the pins, and the blade track segment, and showing the cover plate at the bottom right.

A turbine shroud segment 22 adapted for use in a gas turbine engine 10 is shown in FIGS. 2-4. The turbine shroud segment 22 includes a carrier 24, a blade track segment 26 coupled to the carrier 24 via pins 32, 34, and a cover plate 29 joined to the blade track segment 26 as suggested in FIGS. 2-4. The carrier 24 is a metallic support component configured to interface with other metallic components of the gas turbine engine 10. The blade track segment 26 is a ceramic matrix composite component configured to directly face the high temperatures of a gas path 21 of the gas turbine engine 10. The cover plate 29 extends over pin holes 67, 68 in an aft mount post 72 of the blade track segment 26.

Pin holes formed in the blade track segment 26 may create leakage paths for cooling air between the carrier 24 and the blade track segment 26. A chordal seal may be used to seal between the blade track segment 26 and the carrier 24 on the aft mount post 72, however, the position of the chordal seal may be constrained by the arrangement of the pin holes. Blind holes may be machined into the ceramic matrix composite for the axial pins 32, 34 to reduce the leakage paths; however, the machined blind holes may compromise the structural integrity of the blade track segment 26 such that the aft mount post 72 may not withstand the load imparted by the pressure loads.

The cover plate 29 provides a seal surface 42 that is engaged as part of a chordal seal 65 as shown in FIG. 3. The chordal seal 65 is configured to resist movement of gases into the turbine shroud segment 22. The cover plate 29 allows for a low profile of the aft mount post 72 in the radial direction R since the pin holes 67, 68 for coupling the blade track segment 26 can be radially co-located with the chordal seal 65 reducing the radial height of the turbine shroud segment 22.

The cover plate 29 extends at least circumferentially partway about the axis between a first circumferential end 46 and a second circumferential end 48 as shown in FIG. 4. The second circumferential end 48 is spaced apart circumferentially from the first circumferential end 46. The cover plate 29 extends the entire circumferential length of the blade track segment 26 in the illustrative embodiment so as to cover both pin holes 67, 68 of the blade track segment 26.

The cover plate 29 is shaped to include an aft-facing land surface 42 and a forward-facing attachment surface 44 as shown in FIGS. 3 and 4. The surfaces 42, 44 extend between and interconnect the first and second circumferential ends 46, 48. The aft-facing land surface 42 provides the seal surface 42 in the illustrative embodiment. The forward-facing attachment surface 44 of the cover plate 29 is opposite the seal surface 42 and engages the aft-facing surface 73 of the aft mount post 72 of the blade track segment 26.

The cover plate 29 comprises metallic materials in the illustrative embodiment. The cover plate 29 comprises metallic materials so as to conduct heat from the blade track segment 26.

The cover plate 29 is joined to the blade track segment via a braze layer 31 as shown in FIG. 3. The braze layer 31 engages the attachment surface 44 of the cover plate 29 and the aft-facing surface 73 of the aft mount post 72 to fix the cover plate 29 in place relative to the blade track segment 26 in the illustrative embodiment.

In some embodiments, the cover plate 29 may comprise ceramic-containing materials. The cover plate 29 may comprise ceramic-containing materials so as to have a coefficient of thermal expansion similar to that of the blade track segment 26.

In some embodiments, the cover plate 29 may comprise ceramic matrix composite materials. The ceramic matrix composite cover plate 29 may be joined to the blade track segment 26 via a ceramic-containing matrix material co-infiltrating both the cover plate 29 and the blade track segment 26. The cover plate 29 and the blade track segment 26 may be co-infiltrated to fix the cover plate 29 in place relative to the blade track segment 26.

Figure 1:
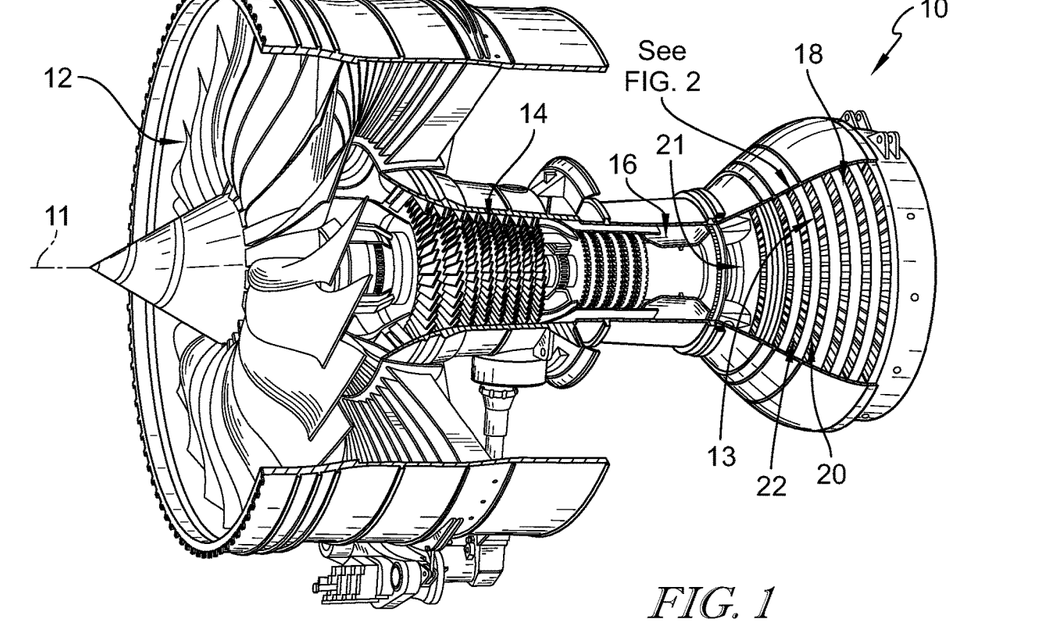
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk 17 for rotation therewith. The hot, high pressure combustion products from the combustor 16 are directed toward the blades 15 of the turbine wheel assemblies 13 along the gas path 21. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of shroud segments 22, one of which is shown in FIGS. 3 and 4, that extend only partway around the central axis 11 and cooperate to surround the turbine wheel assembly 13. The shroud segments 22 are sealed against one another, such as by strip seal members, to provide a continuous turbine shroud assembly 20.

Each shroud segment 22 includes the carrier 24, the blade track segment 26, and the cover plate 29 as shown in FIGS. 2-4. In the illustrative embodiment, each shroud segment 22 further includes an intermediate carrier 28. The intermediate carrier 28 is designed to engage the blade track segment 26 so as to couple the blade track segment 26 to the carrier 24 and distribute mounting of the blade track segment 26 to the carrier 24.

In other embodiments, the turbine shroud assembly 20 is annular and non-segmented to extend fully around the central axis 11 and surround the turbine wheel assembly 13. In yet other embodiments, certain components of the turbine shroud assembly 20 are segmented while other components are annular and non-segmented.

The carrier 24 included in each shroud segment 22 is coupled to the case 19 of the engine 10 as shown in FIG. 2. In the illustrative embodiment, the carrier 24 is segmented, while in other embodiments, the carrier 24 may be a full hoop and extend about the axis 11.

Each carrier segment 24 illustratively includes a carrier body 50, a plurality of locating pads 52, and a plurality of orientation features 53, as shown in FIGS. 3 and 4. The carrier body 50 extends partway around the axis 11 and is shaped to form an attachment-receiving space 51. The plurality of locating pads 52 each extend radially inward from the carrier body 50 into contact with a radially-outwardly facing surface 74 of the attachment portion 66 of the blade track segment 26 to radially locate the blade track segment 26 relative to the carrier 24. The orientation features 53 extend radially inward from the carrier body 50 and engage the intermediate carrier 28 to axially and circumferentially orientate the intermediate carrier 28 relative to the carrier 24.

The carrier body 50 includes an outer wall 54, hangers 56, and fore and aft radial walls 58, 60 as shown in FIGS. 3 and 4. The outer wall 54 extends circumferentially partway about the axis 11 and is shaped to include through holes 55 that receive a portion of the intermediate carrier 28. The hangers 56 extend radially outward from the outer wall 54 and engage the case 19 to couple the turbine shroud segment 22 to the rest of the engine 10. Each of the fore and aft radial walls 58, 60 extend radially inward from the outer wall 54 on opposite axial ends of the outer wall 54. The aft radial wall 60 is spaced apart axially from the fore radial wall 58 to define the attachment-receiving space 51 therebetween that receives the attachment portion 66 of the blade track segment 26.

The aft radial wall 60 is shaped to include the protrusion 62 as shown in FIGS. 3 and 4. The protrusion 62 extends axially forward from the aft radial wall 60 of the carrier 24. The protrusion 62 engages the seal surface 42 of the cover plate 29 to axially locate the blade track segment 26 relative to the carrier 24. Together the protrusion 62 and the seal surface 42 of the cover plate 29 provide the chordal seal 65.

Figure 5:
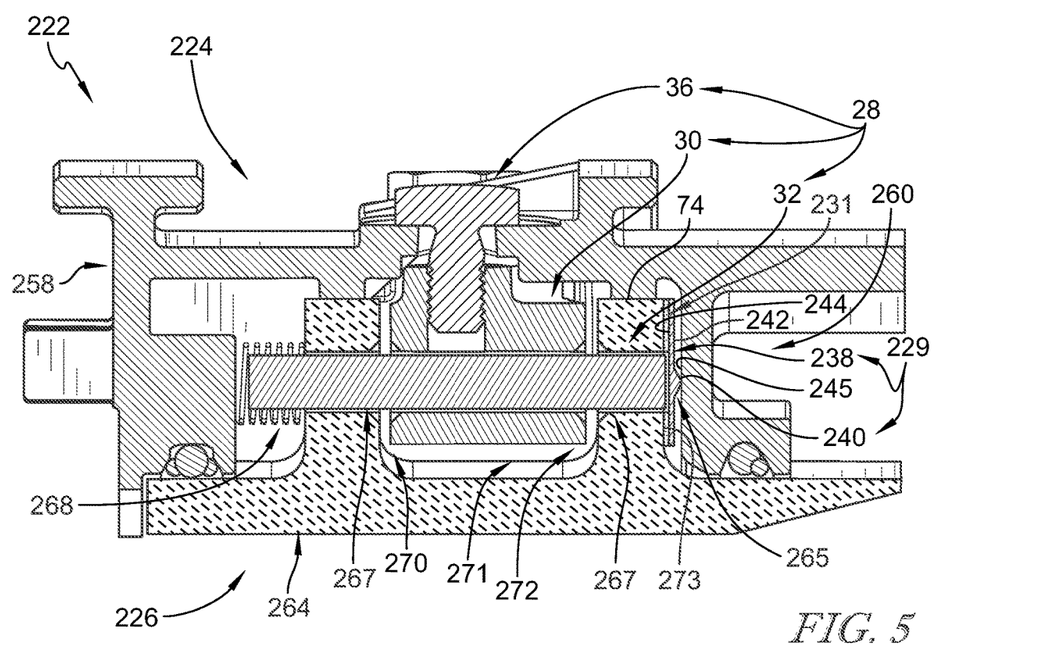
FIG. 5 is a detail cross-sectional view of a second turbine shroud assembly like the turbine shroud assembly in FIGS. 1-4 showing that the chordal seal of the turbine shroud assembly is integrated into the cover plate and is landed on the carrier to block gasses from moving into the turbine shroud assembly.
Figure 6:
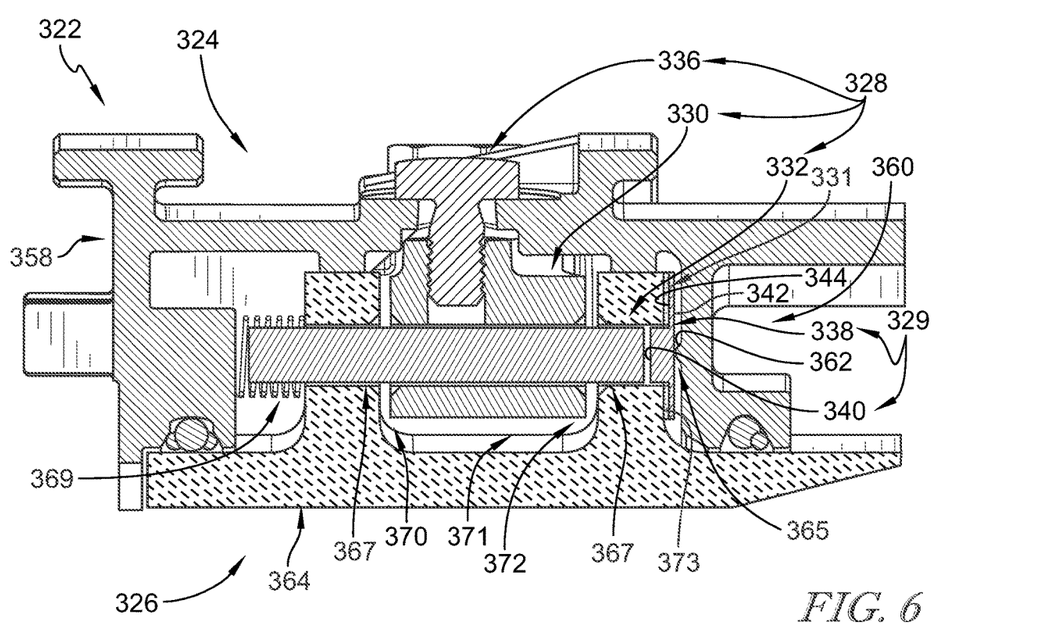
FIG. 6 is a detail cross-sectional view of a third turbine shroud assembly like the turbine shroud assembly in FIGS. 1-4 showing that the cover plate includes a seal panel and a pin plug that extends into a post of the blade track segment to provide additional contact surface for joining the cover plate to the blade track segment.

In the illustrative embodiment, the attachment-receiving space 51 of the carrier 24 is pressurized such that the pressure biases the attachment portion 66 of the blade track segment 26 axially aft against the chordal seal 65. To aid in the axial location of the attachment portion 66 of the blade track segment 26 on the protrusion 62, the turbine shroud segment 22 further includes a bias member 69 as shown in FIGS. 4-6. The bias member 69 is arranged between the attachment portion 66 of the blade track segment 26 and the fore radial wall 58 of the carrier 24 and configured to bias the cover plate 29 axially aft against the protrusion 62 and maintain engagement of the chordal seal 65.

In the illustrative embodiment, the bias member 69 is located between the axial pin locator 61 of the forward radial wall 58 and the fore mount post 70 of the blade track segment 26. The bias member 69 extends around a portion of the corresponding pin 32, 34.

In the illustrative embodiment, the turbine shroud segment 22 further includes a plurality of seals 88 as shown in FIGS. 3 and 4. The seals 88 may be tandem seals 88 that are arranged in channels formed in the fore and aft radial walls 58, 60 of the carrier 24. The seals 88 are configured to engage the runner 64 of the blade track segment 26 to seal the attachment-receiving space 51. In this way, the attachment-receiving space 51 may be pressurized.

The blade track segment 26 of each shroud segment 22 comprises ceramic matrix composite materials as suggested in FIGS. 2 and 3. The blade track segment 26 is held in place adjacent to tips of blades 15 to block combustion products from passing over the blades 15 without pushing the blades 15 to rotate.

The blade track segment 26 is illustratively formed to include a runner 64 and the attachment portion 66 as shown in FIGS. 3 and 4. The runner 64 is arcuate and extends partway around axis 11 adjacent to blades 15. The attachment portion 66 extends radially outward from the runner 64 to provide structure for coupling the blade track segment 26 to the carrier 24.

In the illustrative embodiment, the attachment portion 66 includes the forward or first mount post 70 and the aft or second mount post 72 as shown in FIGS. 3 and 4. Each mount post 70, 72 extends radially outward from the runner 64. The second mount post 72 is spaced apart axially from the first mount post 70 to define a channel 71 therebetween. In other embodiments, the attachment portion 66 may be provided by L-shaped hangers, fir-tree shaped members, dovetail members, box shape panels, or other suitable features.

In the illustrative embodiment, each of the first mount post 70 and the second mount post 72 are also shaped to include the corresponding pin holes 67, 68 as shown in FIGS. 3 and 4. The first pin hole 67 extends axially through the first mount post 70 and is axially aligned with the first pin hole 67 that extends axially through the second mount post 72. The second pin holes 68 is spaced apart circumferentially from the first pin hole 67. The second pin hole 68 extends axially through the first mount post 70 and is axially aligned with the second pin hole 68 that extends axially through the second mount post 72.

The intermediate carrier 28 includes an intermediate carrier body 30, the pins 32, 34, and a plurality of retainers 36 as shown in FIGS. 2-4. The intermediate carrier body 30 is located in the channel 71 between the mount posts 70, 72 of the blade track segment 26. The pins 32, 34 extend axially through the attachment portion 66 of the blade track segment 26 and the intermediate carrier body 30 to couple the blade track segment 26 to the intermediate carrier body 30. Each of the retainers 36 extends outward from the intermediate carrier body 30 to the carrier 24 and engages the carrier 24 to couple the intermediate carrier 28 to the carrier 24.

The axial pins 32, 34 and the radial retainers 36 of the intermediate carrier 28 provide an attachment for coupling the blade track segment 26 to the carrier 24 that accommodates the surface tolerance of the ceramic matrix composite materials, while minimizing stress in the blade track segment 26 and minimizing leakage paths in the overall assembly 20. The intermediate carrier 28 eliminates additional attachment mechanisms that may reduce the overall stack of the assembly 20 from the carrier 24 to the gas path 21.

Further, by having axial pins 32, 34 and radial retainers 36, the number of leakage paths between the blade track segment 26 and the carrier 24 may be reduced. The cover plate 29 reduces leakage from the remaining leakage paths between the blade track segment 26 and the carrier 24.

In the illustrative embodiment, the intermediate carrier body 30 is shaped to include pin holes 81, 83 on circumferential ends 80, 82 of the intermediate carrier body 30 as shown in FIG. 4. The first pin hole 81 extends axially through the intermediate carrier body 30 on a first circumferential end 80 of the intermediate carrier body 30. The second pin hole 83 extends axially through the intermediate carrier body 30 on a second circumferential end 82 of the intermediate carrier body 30 opposite the first circumferential end 80.

In the illustrative embodiment, the pin holes 81, 83 are (race track) elongated holes. The race track shape of the pin holes 81, 83 may help reduce stress in the ceramic matrix composite blade track segment 26. An anti-rotation feature may then used to circumferentially locate the blade track segment 26 relative to the intermediate carrier 28. In some embodiments, the orientation features 53 may be configured to anti-rotate the segment 22.

The first pin 32 extends axially through the first pin hole 67 formed in the first mount post 70, the first pin hole 81 of the intermediate carrier body 30, and the first pin hole 67 formed in the second mount post 72 to couple the blade track segment 26 to the intermediate carrier body 30. The second pin 34 extends axially through the second pin hole 68 formed in the first mount post 70, the second pin hole 83 of the intermediate carrier body 30, and the second pin hole 68 formed in the second mount post 72 to couple the blade track segment 26 to the intermediate carrier body 30.

In the illustrative embodiment, each of the pin holes 67, 68 formed in the blade track segment 26 and the pin holes 81, 83 formed in the intermediate carrier body 30 respectively have chamfers 90, 91 on the edges of the holes 67, 68, 81, 83 as shown in FIG. 4. The holes 67, 68 in the blade track segment 26 have chamfers 90 and the holes 81, 83 in the intermediate carrier body 30 have chamfers 91. The chamfers 90, 91 help reduce stress in the pins 32, 34 as well as the blade track segment 26. In other embodiments, the shape of the pins 32, 34 may be altered to reduce stress in the pins 32, 34.

Each of the retainers 36 each include a coupling 84 and a fastener 86 as shown in FIGS. 3 and 4. The coupling 84 is integrally formed with the intermediate carrier body 30 and extends radially outward from the intermediate carrier body 30. The fastener 86 extends radially inward through the corresponding hole 55 formed in the outer wall 54 into the corresponding coupling 84. The fasteners 86 have threads 89 that mate with corresponding threads formed in the coupling 84 to couple the intermediate carrier 28 with the assembled blade track segment 26 to the carrier 24. The fasteners 86 may be tightened to bring the radially-outwardly facing surface 74 of the mount posts 70, 72 into contact with the locating pads 52 of the carrier 24.

In other embodiments, the retainers 36 may each include a stud and a fastener. The stud may be integrally formed with the intermediate carrier body 30 and extends radially outward from the intermediate carrier body 30 through the carrier 24. The fasteners have threads that mate with corresponding threads formed in the stud to couple the intermediate carrier 28 with the assembled blade track segment 26 to the carrier 24. The fasteners may be tightened to bring the radially-outwardly facing surface 74 of the mount posts 70, 72 into contact with the locating pads 52 of the carrier 24.

In the illustrative embodiment, the intermediate carrier body 30 includes at least three retainers 36 as shown in FIG. 4. One retainer 36 extends radially outward from the intermediate carrier body 30 at a center of the intermediate carrier body 30. The other two retainers 36 are located at opposite circumferential ends 80, 82 of the intermediate carrier body 30.

The axial orientation tabs 53 formed in the outer wall 54 of the carrier body 50 are configured to engage the intermediate carrier 28 on opposite axial sides 85, 87 as shown in FIG. 3. The axial orientation tabs 53 are configured to axially align the intermediate carrier 28 relative to the carrier 24 so that the intermediate carrier 28 is in a predetermined axial position relative to the carrier 24.

In the illustrative embodiment, the axial orientation tabs 53 engage the coupling 84 of the corresponding retainer 36 on the opposite axial sides 85, 87 as shown in FIG. 3. One axial orientation tab 53 engages the fore side 85 of the coupling 84, while the other axial orientation tab 53 engages the aft side 87 of the coupling 84. The axial orientation tabs 53 are configured to axially orientate the intermediate carrier 28 relative to the carrier 24.

In some embodiments, the carrier 24 may further include circumferential orientation tabs formed in the outer wall 54 of the carrier body 50 are configured to engage the coupling 84 of the corresponding retainer 36 at the opposite circumferential ends 80, 82 of the intermediate carrier body 30. One circumferential orientation tab engages the first circumferential end 80 of the intermediate carrier body 30, while the other circumferential orientation tab engages the second circumferential end 82 of the intermediate carrier body 30. The circumferential orientation tabs are configured to circumferentially orientate the intermediate carrier body 30 relative to the carrier 24.

A method of assembling the turbine shroud segment 22 includes several steps. The method begins by aligning the cover plate 29 with the pin holes 67, 68 in the aft mount post 72 and fixing the cover plate 29 to the aft mount post 72 of the blade track segment 26. The cover plate 29 is fixed to the blade track segment 26 so as to cover the pin holes 67, 68 with the cover plate 29.

The cover plate 29 is fixed to the aft mount post 72 by brazing the attachment surface 44 of the cover plate 29 to the aft-facing surface 73 of the aft mount post 72 in the illustrative embodiment. The braze layer 31 formed between the aft mount post 72 and the cover plate 29 fixes the cover plate 29 to the blade track segment 26. In other embodiments, the cover plate 29 may be fixed to the aft mount post 72 by co-infiltrating the ceramic matrix composite cover plate 29 with the blade track segment 26.

Once the cover plate 29 is fixed to the blade track segment 26 over the pin holes 67, 68, the method continues by arranging the intermediate carrier body 30 axially between the first mount post 70 and the second mount post 72. The intermediate carrier body 30 is arranged in the channel 71 such that the pin holes 81, 83 formed in the intermediate carrier body 30 align circumferentially with the pin holes 67, 68 in both the first mount post 70 and the second mount post 72.

After arranging the intermediate carrier body 30 between the mount posts 70, 72, one of the pins 34 is inserted through the corresponding pin hole 67 formed in the first mount post 70, the corresponding pin hole 81 formed in the intermediate carrier body 30, and the corresponding pin hole 68 formed in the second mount post 72 to couple the blade track segment 26 to the intermediate carrier body 30. This step is repeated for the other pin 34 such that the pin 34 extends through the corresponding pin hole 68 formed in the first mount post 70, the corresponding pin hole 83 formed in the intermediate carrier body 30, and the corresponding pin hole 68 formed in the second mount post 72.

In some embodiments, after the pins 32, 34 are inserted into the blade track segment 26 and intermediate carrier body 30 to couple the components 26, 30 together, the bias member 69 is arranged on one end of the pin 32, 34 before the assembled components 26, 30 are arranged in the attachment-receiving space 51 of the carrier 24.

In some embodiments, before the assembled blade track segment 26 and intermediate carrier body 30 are arranged in the attachment-receiving space 51, the method includes arranging the seals 88 in channels formed in the fore and aft walls 58, 60 of the carrier 24. As the assembled blade track segment 26 and intermediate carrier body 30 are arranged in the attachment-receiving space 51, the seals 88 engage the runner 64 of the blade track segment 26 to seal the attachment-receiving space 51.

Once the couplings 84 are aligned with the corresponding holes 55 formed in the carrier 24, the retainer 36 of the intermediate carrier 28 is coupled with the carrier 24. The retainer 36 is coupled with the carrier 24 by inserting the fasteners 86 through the holes 55 in the carrier 24 and into the respective coupling 84. The fasteners 86 are then tightened to bring the radially-outwardly facing surface 74 of both mount posts 70, 72 into contact with the locating pads 52. In the illustrative embodiment, the orientation features 53 help guide the intermediate carrier body 30 to the correct position so that the locating pads 52 contact the surface 74 of the blade track segment 26 in the correct position.

The locating pads 52 and orientation features 53 locate the blade track segment 26 in the correct position so that the protrusion 62 on the aft radial wall 60 engage the seal surface 42 of the cover plate 29. The bias member 69 then engages with the fore mount post 70 to bias the seal surface 42 of the cover plate 29 into contact with the protrusion 62 once the blade track segment 26 is in the correction radial position relative to the carrier 24.

Another embodiment of a turbine shroud segment 222 in accordance with the present disclosure is shown in FIG. 5. The turbine shroud segment 222 is substantially similar to the turbine shroud segment 22 shown in FIGS. 1-4 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a carrier 224, a blade track segment 226, an intermediate carrier 228, and a cover plate 229 as shown in FIG. 5. The intermediate carrier 228 is configured to couple the blade track segment 226 to the carrier 224. The cover plate 229 is joined to the blade track segment 226 and extends over pin holes 267 (only one shown) in an aft post 272 of the blade track segment 226 to provide a portion of a chordal seal 265.

In the illustrative embodiment, the cover plate 229 includes a seal panel 238 and a protrusion 240 as shown in FIG. 5. The seal panel 238 extends at least circumferentially partway about the axis 11. The protrusion 240 extends axially aft from the seal panel 238 and engages an aft radial wall 260 of the carrier 224.

The protrusion 240 engages with a forward-facing land surface 245 of the aft radial wall 260 as shown in FIG. 5. The forward-facing land surface provides a seal surface 245 that is engaged as part of the chordal seal 265 configured to resist movement of gases into the turbine shroud segment 222.

The seal panel 238 is shaped to include an aft-facing surface 242 and a forward-facing attachment surface 244 as shown in FIG. 5. The aft-facing surface 242 faces the aft radial wall 260 such that the protrusion 240 extends aft from the aft-facing surface 242. The forward-facing surface 244 is opposite the aft-facing surface 242 and engages an aft-facing surface 273 of the aft mount post 272.

The cover plate 229 is joined to the blade track segment via a braze layer 231 as shown in FIG. 5. The braze layer 231 engages the attachment surface 244 of the cover plate 229 to fix the cover plate 229 in place relative to the blade track segment 226.

A method of assembling the turbine shroud segment 222 includes several steps. The method begins by aligning the cover plate 229 with the pin hole 267 in the aft mount post 272 and fixing the cover plate 229 to the aft mount post 272 of the blade track segment 226.

The cover plate 229 is fixed to the blade track segment 226 so as to cover the pin hole 267 with the cover plate 229. In the illustrative embodiment, the attachment surface 242 is fixed to the aft mount post 272 so that the protrusion 240 extends axially aft away from the aft mount post 272.

Once the cover plate 229 is fixed to the blade track segment 226 over the pin hole 267, the method continues by arranging the intermediate carrier body 230 axially between the first mount post 270 and the second mount post 272. After arranging the intermediate carrier body 230 between the mount posts 270, 272, the pin 232 is inserted through the corresponding pin holes 267, 281, 283 to couple the blade track segment 226 to the intermediate carrier body 230.

The retainers 236 are then coupled to the carrier 224 to couple the blade track segment 226 to the carrier 224 in the correct radial position so that the protrusion 240 of the cover plate 229 engages the seal surface 245 of the aft radial wall 262. The bias member 269 engages with the fore mount post 270 to bias the protrusion 240 of the cover plate 29 into contact with the aft radial wall 262 when the blade track segment 226 is in the correction radial position relative to the carrier 224.

Another embodiment of a turbine shroud segment 322 in accordance with the present disclosure is shown in FIG. 6. The turbine shroud segment 322 is substantially similar to the turbine shroud segment 22 shown in FIGS. 1-4 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 322.

The turbine shroud segment 322 includes a carrier 324, a blade track segment 326, an intermediate carrier 328, and a cover plate 329 as shown in FIG. 6. The intermediate carrier 328 is configured to couple the blade track segment 326 to the carrier 324. The cover plate 329 is joined to the blade track segment 326 and extends over pin holes 367 (only one shown) in an aft mount post 372 of the blade track segment 326.

In the illustrative embodiment, the cover plate 329 includes a seal panel 338 and a pin plug 340 as shown in FIG. 6. The seal panel 338 extends at least circumferentially partway about the axis 11. The pin plug 340 extends into a corresponding pin hole 367 formed in an aft mount post 372 of the blade track segment 326. The pin plug 340 extends into the pin hole 367 to provide additional contact surface for joining the cover plate 329 to the blade track segment 326.

The seal panel 338 is shaped to include an aft-facing surface 342 and a forward-facing attachment surface 344 as shown in FIG. 6. The aft-facing surface 342 faces the aft radial wall 360. The forward-facing surface 344 is opposite the aft-facing surface 342 and engages an aft-facing surface 373 of the aft mount post 372. The pin plug 340 extends axially forward from the attachment surface 344 into the pin hole 367.

The aft radial wall 360 includes a protrusion 362 that engages the aft-facing surface 342 of the seal panel 338 as shown in FIG. 6. The protrusion 362 extends axially forward form the aft radial wall 360 and engages the seal panel 338.

The cover plate 329 is joined to the blade track segment via a braze layer 331 as shown in FIG. 6. The braze layer 331 engages the attachment surface 344 of the cover plate 329 to fix the cover plate 329 in place relative to the blade track segment 326.

A method of assembling the turbine shroud segment 322 includes several steps. The method begins by aligning the cover plate 329 with the pin hole 367 in the aft mount post 372 and fixing the cover plate 329 to the aft mount post 372 of the blade track segment 326.

The cover plate 329 is aligned with the corresponding pin hole 367 so that the pin plug 340 is aligned with the corresponding pin hole 367. Once the pin plug 340 is aligned, the cover plate 329 is fixed to the aft mount post 372 so that the pin plug 340 extends into the corresponding pin hole 367.

In some embodiments, the cover plate 329 is fixed to the aft mount post 372 by press fitting the pin plug 340 into the pin hole 367. The seal panel 338 may still be brazed to the aft-facing surface 373 of the aft mount post 372.

Once the cover plate 329 is fixed to the blade track segment 326, the intermediate carrier body 330 may be arranged in the channel 371 between the mount posts 370, 372 and the pins 332 inserted through the blade track segment 326 and the intermediate carrier body 330. The retainers 336 may then be coupled to the carrier 324 to fix the assembled blade track segment 326, intermediate carrier 328, and cover plate 329 to the carrier 324.

The present disclosure relates to a method for improving the sealing between blade track segments 26, 226, 326 and the corresponding carrier 24, 224, 324, while allowing for the optimal placement of a chordal seal 65, 265, 365 at the same time. The blade track segment 26, 226, 326 may be retained to an intermediate carrier body 30, 230, 330 by a plurality of retaining pins 32, 34, 232, 332 that penetrate the forward and aft mount posts 70, 72, 270, 272, 370, 372. However, to seal the segment 22, 222, 322 at the aft mount post 72, 272, 372, a chordal seal must be at a lower radius than the pin holes 67, 68, 267, 367 in the aft mount post 72, 272, 372 of the blade track segment 26, 226, 326. If the chordal seal is not below the hole 67, 68, 267, 367, a leakage path is created for the cooling air to bypass the chordal seal.

However, machining blind holes in the blade track segment 26, 226, 326 may be impractical and may not leave the necessary thickness in the mount post 72, 272, 372 to carry the load imparted by the pressure loads As such, the cover plate 29, 229, 329 is joined or affixed (braze, weld, press fit into the holes . . . ) to the aft mount post 71, 272, 372. The plate 29, 229, 329 may have a constrained radial height, but may extend from edge to edge circumferentially.

By extending across the entire width of the component 26, 226, 326, the cover plate 29, 229, 329 may also be used as a landing for the chordal seal 65, 265, 365. The cover plate 29, 229, 329 may also allow the pin holes 67, 68, 267, 367 to be located closer to the gas path 21, since the chordal seal 65, 265, 365 may now run over the location of the holes 67, 68, 267, 367 instead of needing to be located fully below the holes 67, 68, 267, 367.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use in a gas turbine engine, the turbine shroud assembly comprising a carrier comprising metallic materials and arranged to extend circumferentially at least partway about an axis, a blade track segment comprising ceramic matrix composite materials, the blade track segment formed to include a runner shaped to extend circumferentially partway around the axis, a forward mount post that extends radially outward from the runner, and an aft mount post that extends radially outward from the runner, the aft mount post spaced apart axially from the forward mount post to define a channel therebetween, a first pin that extends into a first pin hole formed through the forward mount post and a first pin hole formed through the aft mount post to couple the blade track segment to the carrier, and a cover plate joined to the blade track segment and arranged over at least a portion of the first pin hole formed through the aft mount post, wherein the cover plate provides a seal surface that engaged as part of a seal that is radially aligned with the first pin hole of the aft mount post so as to allow for a low profile aft mount post while also resisting the movement of gases across the seal.

2. The turbine shroud assembly of claim 1, wherein the seal is a chordal seal formed between the carrier and the cover plate to resist the movement of gases radially into or out of the turbine shroud assembly along the aft mount post of the blade track segment.

3. The turbine shroud assembly of claim 2, wherein the chordal seal is provided by a protrusion from the carrier that engages an aft-facing land surface of the cover plate.

4. The turbine shroud assembly of claim 2, wherein the chordal seal is provided by a protrusion from the cover plate that engages a forward-facing land surface of the carrier.

5. The turbine shroud assembly of claim 1, wherein the cover plate comprises ceramic-containing materials so as to have a coefficient of thermal expansion similar to that of the blade track segment.

6. The turbine shroud assembly of claim 5, wherein the cover plate is joined to the blade track segment via a braze layer to fix the cover plate in place relative to the blade track segment.

7. The turbine shroud assembly of claim 5, wherein the cover plate comprises ceramic matrix composite materials and is joined to the blade track segment via a ceramic-containing matrix material co-infiltrating both the cover plate and the blade track segment to fix the cover plate in place relative to the blade track segment.

8. The turbine shroud assembly of claim 1, wherein the cover plate comprises metallic materials so as to conduct heat from the blade track segment.

9. The turbine shroud assembly of claim 8, wherein the cover plate is joined to the blade track segment via a braze layer to fix the cover plate in place relative to the blade track segment.

10. The turbine shroud assembly of claim 1, wherein the cover plate includes a seal panel and a pin plug that extends into the first pin hole of the aft mount post to provide additional contact surface for joining the cover plate to the blade track segment.

11. An assembly adapted for use in high temperature applications, the assembly comprising a carrier comprising metallic materials, a heat shield comprising ceramic matrix composite materials adapted to protect the carrier from high temperatures in a high temperature zone, the heat shield formed to include a runner arranged to face the high temperature zone, a forward mount post that extends outward from the runner away from the high temperature zone, and an aft mount post that extends outward from the runner away from the high temperature zone, the aft mount post spaced apart from the forward mount post to define a channel therebetween, a first pin that extends into a first pin hole formed through the forward mount post and a first pin hole formed through the aft mount post to couple the heat shield to the carrier, and a cover plate joined to the heat shield and arranged to close off at least a portion of the first pin hole formed through the aft mount post so as to block movement of the first pin through the aft mount post.

12. The assembly of claim 11, wherein a seal is formed between the carrier and the cover plate to resist the movement of gases.

13. The assembly of claim 12, wherein the seal is provided by a protrusion from the carrier that engages a land surface of the cover plate.

14. The assembly of claim 12, wherein the seal is provided by a protrusion from the cover plate that engages a land surface of the carrier.

15. The assembly of claim 12, wherein the cover plate includes a seal panel and a pin plug that extends from the seal panel into the first pin hole of the aft mount post to provide additional contact surface for joining the cover plate to the blade track segment.

16. The assembly of claim 11, wherein the cover plate comprises one of ceramic-containing materials so as to have a coefficient of thermal expansion similar to that of the heat shield and metallic materials so as to conduct heat from the heat shield.

17. An assembly adapted for use in high temperature applications, the assembly comprising a carrier comprising metallic materials, a heat shield comprising ceramic matrix composite materials adapted to protect the carrier from high temperatures in a high temperature zone, the heat shield formed to include a runner arranged to face the high temperature zone, a forward mount post that extends outward from the runner away from the high temperature zone, and an aft mount post that extends outward from the runner away from the high temperature zone, the aft mount post spaced apart from the forward mount post to define a channel therebetween, a first pin that extends into a first pin hole formed through the forward mount post and a first pin hole formed through the aft mount post to couple the heat shield to the carrier, and a cover plate joined to the heat shield and arranged over at least a portion of the first pin hole formed through the aft mount post, wherein the cover plate provides a seal surface that engages the carrier to form a seal that is aligned with the first pin hole of the aft mount post so as to allow for a low profile aft mount post while also resisting the movement of gases across the seal.

18. The assembly of claim 17, wherein the seal is provided by a protrusion from the carrier that engages a land surface of the cover plate.

19. The assembly of claim 17, wherein the seal is provided by a protrusion from the cover plate that engages a land surface of the carrier.

20. The assembly of claim 17, wherein the cover plate includes a seal panel and a pin plug that extends from the seal panel into the first pin hole of the aft mount post to provide additional contact surface for joining the cover plate to the blade track segment.

* * * * *